United States Patent
Ehlers et al.

[11] Patent Number: 6,014,287
[45] Date of Patent: Jan. 11, 2000

[54] SPEED PLATE

[75] Inventors: Kirt Ehlers; Hoahane Douangdara, both of Roy; Sheen-Haw Jenn, Huntsville; Michael Scoresby, Roy; Dennis Evans, Fruit Height, all of Utah

[73] Assignee: Iomega Corporation, Roy, Utah

[21] Appl. No.: 09/079,564

[22] Filed: May 15, 1998

[51] Int. Cl.[7] ................................................. G11B 15/64
[52] U.S. Cl. ..................................... 360/102; 360/130.34
[58] Field of Search .................................. 360/102, 128, 360/132, 130.34; 369/291

[56] References Cited

U.S. PATENT DOCUMENTS

| | | | |
|---|---|---|---|
| 4,376,960 | 3/1983 | Karol | 360/99.01 |
| 4,400,748 | 8/1983 | Bauck et al. | 360/99 |
| 4,419,704 | 12/1983 | Radman et al. | 360/102 |
| 4,600,955 | 7/1986 | Regruit | 360/99.01 |
| 4,620,250 | 10/1986 | Hills | 360/102 |
| 4,743,989 | 5/1988 | Bauck et al. | 360/133 |
| 4,768,124 | 8/1988 | Bauck et al. | 360/133 |
| 4,769,733 | 9/1988 | Freeman et al. | 360/133 |
| 4,794,480 | 12/1988 | Jones et al. | 360/99.04 |
| 4,975,794 | 12/1990 | Losee et al. | 360/104 |
| 5,005,098 | 4/1991 | Kanada | 360/130.34 |
| 5,012,463 | 4/1991 | Farnsworth et al. | 369/100 |
| 5,077,726 | 12/1991 | Dodds et al. | 369/291 |
| 5,237,477 | 8/1993 | Hodapp et al. | 360/128 |
| 5,293,287 | 3/1994 | Tzur et al. | 360/98.03 |
| 5,537,281 | 7/1996 | Ma et al. | 360/133 |
| 5,775,623 | 7/1998 | Long | 242/417.1 |

OTHER PUBLICATIONS

Hwang, M., http://curricula.mit.edu/~2006/Tex...6.html#SECTION00273000000000000000, Feb. 2, 1996, 7 pages.

*Primary Examiner*—William J. Klimowicz
*Attorney, Agent, or Firm*—Woodcock Washburn Kurtz Mackiewicz & Norris LLP

[57] ABSTRACT

A speed plate device that is bonded to a Bernoulli plate for juxtaposition to a rotating flexible magnetic disk so that the flexible disk is rendered substantially rigid by a vacuum formed by the air between the speed plate/Bernoulli plate surface and the disk being urged outwardly under the influence of centrifugal force is disclosed. The speed plate device provides a method and means for spinning flexible magnetic media at high spins without any associated signal loss or modulation normally experienced at these elevated speeds. The speed plate is bonded to a Bernoulli plate and has the advantage of changing the Bernoulli surface, thereby preventing the media from sucking down to the Bernoulli plate at higher speeds. This improvement allows the floppy media to be spun at higher speeds. The speed plate also has a narrow slot that runs radially across the speed plate so that heads can access the flexible magnetic media. This narrow slot also helps to reduce air flow into the head access slot, stabilizes the media by giving more support around the heads, and allows the bottom head to clear the load bar. The speed plate also has a stabilization feature that allows the media to be spun at speeds greater than 5,000 rpm without any instability that may cause signal loss or modulation.

18 Claims, 2 Drawing Sheets

SPEED PLATE

FIELD OF THE INVENTION

This invention relates to the field of magnetic data storage disk drives. More particularly, the invention relates to a speed plate that is bonded to a Bernoulli plate over which a disk is rotated in close proximity.

BACKGROUND

"Flexible" or "floppy" disks are frequently used as a magnetic storage medium because of their portability and low cost. These disks are called "floppy" because they tend to sag away from their center when not otherwise supported. The space between a magnetic disk and the transducer is critical for proper non-contact data recording and pick-up. It has been common practice in the art to flatten and stabilize the floppy disk during the read/write operation by rotating the disk at high speeds in close juxtaposition to a fixed, flat plate sometimes called a "Bernoulli" plate. In this way, an air bearing is formed between the plate and disk such that the gap between the media surface and the plate is held constant. The thin layer of air between the disk and the plate tends to rotate with the disk and to be thrown outwardly by centrifugal force. This creates a vacuum between the plate and the disk which tends to pull the disk close to the plate and cause it to behave in a substantially rigid manner. This magnetic disk behaving in a substantial rigid manner is then rotated in juxtaposition to magnetic read/write heads disposed very closely to the disk so that the heads "fly" on an air bearing in very close proximity to the disk. This has the advantage of allowing high data density, but without the expense associated with rigid magnetic disks.

It is desirable to somehow texturize or break up the surface of the Bernoulli plates, so that the magnetic media will not cling to the surface, or "ring", as with a perfectly smooth plate. Several methods of texturing the surface have previously been disclosed. One such method provides a Bernoulli plate which is prepared by coining the surface of the disk at numerous locations with a sharply pointed tool. The eruptions that are formed as a result of the coining process are then smoothed by electroplating the plate with a suitable material. This provides a smooth surface on the plate as well as a hard, wear-resistant coating. However, this process is time consuming and expensive, and does not result in significantly higher speeds.

A problem associated with the use of the Bernoulli plate by itself is that the spinning media is sucked down to the Bernoulli plate at higher speeds. This leads to a stopping or hub skipping of the spinning media as well as an unstable servo track which results in media failure. It is also desired to spin the flexible media at higher speeds because spinning the media at higher speeds produces more servo writing media, which in turn allows for an increase output without the investment of additional capital equipment. However, a problem associated with these desired higher speeds is that at higher speeds the spinning media become unstable resulting in unstable servo tracks, signal loss, and media failure.

For the foregoing reasons, there is a need for changing the Bernoulli surface so that the magnetic media can be spun at higher rates. There is also a need to stabilizes the spinning media at these higher speeds to prevent any instability or signal loss.

SUMMARY

The present invention is directed to a speed plate that satisfies the need of changing the Bernoulli surface while at the same time providing a stabilization feature so that a flexible media can be spun at a higher speed. By changing the Bernoulli surface, the media is not sucked down to the Bernoulli plate and therefore the floppy media can be spun at higher speeds. By installing a speed plate on the surface of a Bernoulli plate, the Bernoulli surface is reduced to a smaller surface allowing the media to spin faster and remain stable. The speed plate to allows air to flow between the spinning surfaces and hence higher speeds are achievable. The stability feature of the speed plate allows these higher speeds to be achieved without any instability or signal loss. A speed plate having an annular section shape with features of the present invention comprises an outer circumference side, an inner circumference side, a top, a bottom, a leading edge, a trailing edge, an approach surface, and a trailing surface. The speed plate is sized to have the longest possible length without breaking up the Bernoulli surface and a minimum length to avoid media instability or modulation.

The speed plate also has a narrow slot that starts just inside the outer circumference side and runs radially inwards towards the inner circumference side. The narrow slot is sized such that it has the smallest width possible to allow heads to access the magnetic media without the heads hitting or rubbing against the speed plate. The narrow slot is located in a non-symmetric position on the speed plate. It is desired to have more speed plate surface on the approach to the slot than on the trailing surface. The shape of the narrow slot is substantially rectangular along the length of the narrow slot. The narrow slot helps to reduce air flow into the head access slot, stabilizes the media by giving more support around the heads, and also allows the bottom head to clear the load bar.

The speed plate may also have an additional stabilization feature. This stabilization feature comprises a first straight bend in the speed plate that is located at the leading edge and runs parallel to the leading edge radially from the outer circumference side to the inner circumference side. The purpose of this first bend is to smooth the air flow and to prevent scratching the media is it spins over the sharp leading edge of the speed plate. This stabilization feature further comprises a second bump bend that is located at the outside diameter of the speed plate at the corner where the outer circumference side and the leading edge meet. The purpose of this second bump bend is to stabilize the media as it spins over the speed plate. This is evident by the much improved signal at elevated speeds than previously experienced by speed plates without this feature.

The speed plate is bonded to a Bernoulli plate over which a flexible magnetic media is then spun. The speed plate is positioned on the Bernoulli plate so that the narrow slot of the speed plate is located over the Bernoulli plate head access slot.

BRIEF DESCRIPTION OF THE DRAWINGS

These and other features, aspects, and advantages of the present embodiment of the invention will become better understood with regards to the following description, appended claims, and accompanying drawings where:

DETAILED DESCRIPTION

Figure 1:
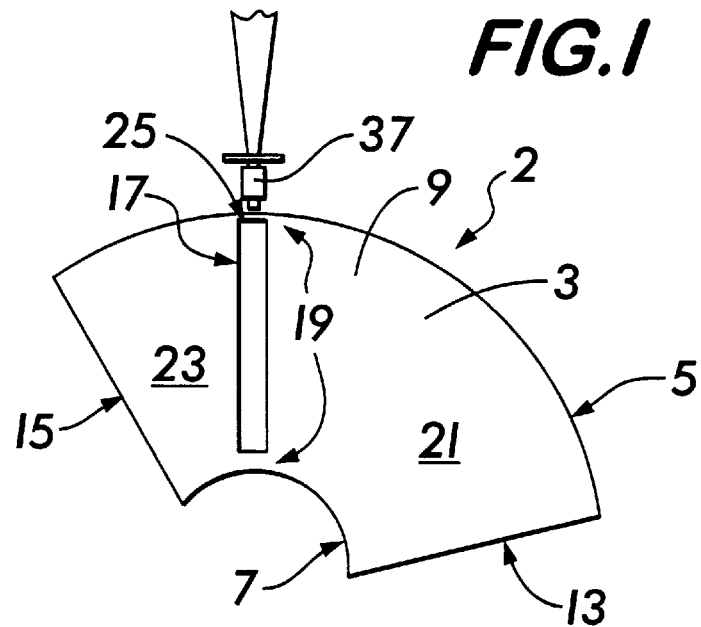
FIG. 1 shows a plan view of the speed plate with the narrow slot.
Figure 2:
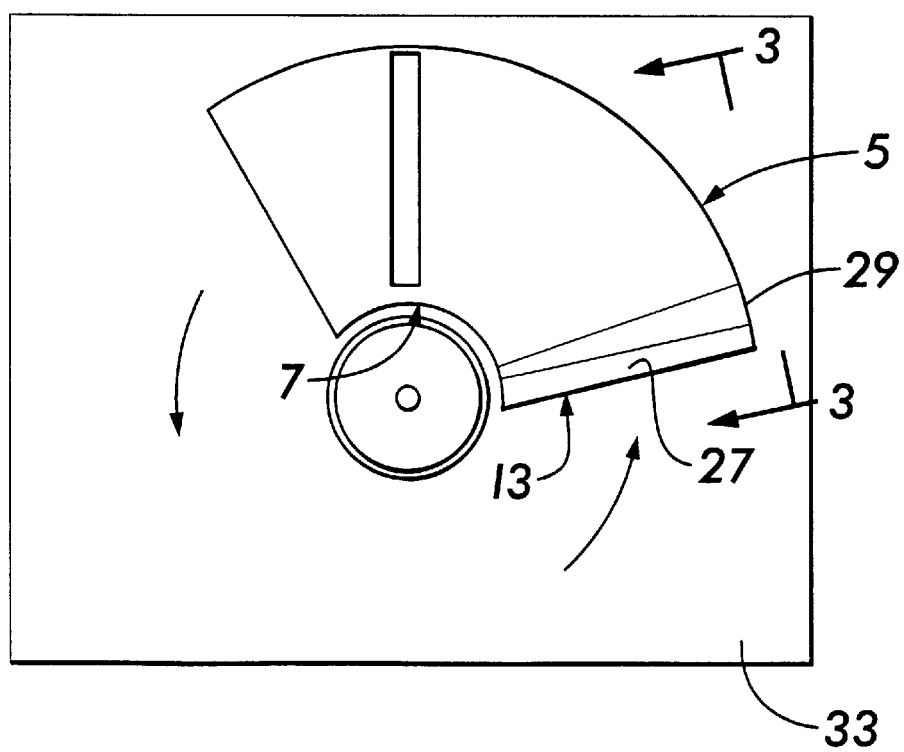
FIG. 2 shows the speed plate of FIG. 1 with the stabilization feature.
Figure 3:
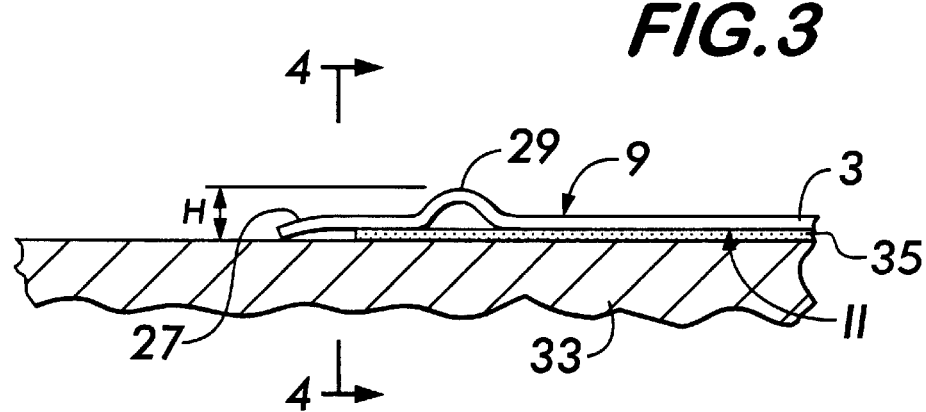
FIG. 3 shows a side view of the speed plate of FIG. 2 of the outer circumference side near the leading edge.
Figure 4:
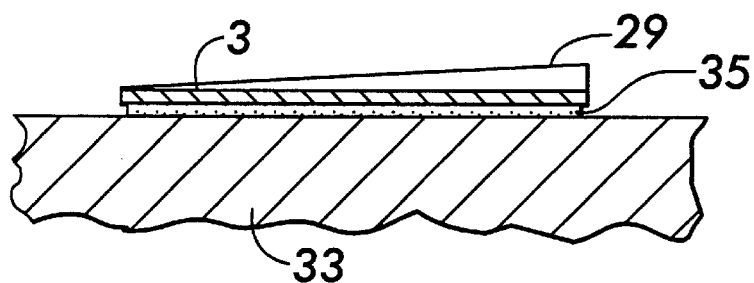
FIG. 4 shows a cross section of the speed plate of FIG. 2 in the area of the stabilization feature.

Throughout the following detailed description similar reference numerals refer to similar elements in all Figures of the drawings.

With reference to FIG. 1 through FIG. 5, shown is a speed plate in accordance with the present invention that is bonded to a Bernoulli plate for juxtaposition to a rotating flexible magnetic disk so that the flexible disk is rendered substantially rigid by a vacuum formed by the air between the speed plate/Bernoulli plate surface and the disk being urged outwardly under the influence of centrifugal force. The speed plate is generally indicated by the reference character 2.

FIG. 1 shows a speed plate 2 in accordance with a preferred embodiment of the present invention. As shown, the speed plate 2 comprises a body 3 formed from a piece of shim metal. The body 3 having an annular section shape includes an outer circumference side 5, an inner circumference side 7, a top surface 9, a bottom surface 11, a leading edge 13, and a trailing edge 15. The body 3 is sized so that it has the longest length possible to stabilize the media before it goes over the narrow slot, but not too long to cause the media to stick to the surface. In a preferred embodiment of this invention, the body 3 is made from 0.005 inch thick stainless steel hard shim material. In a second preferred embodiment of this invention, the body 3 is made from 0.002 inch thick stainless steel hard shim material.

In one preferred embodiment, the outer circumference side 5 of the body 3 has a radius distance of 1.831 inches, and the inner circumference side 7 has a radius distance of 0.510 inches from a reference point at X=0 and Y=0. Also in this preferred embodiment, the four corners of the body 3 of the speed plate 2 can be defined by the corner where the outer circumference side and the leading edge meet being defined by the point X=−0.272 inches and Y=+1.810 inches; the corner where the outer circumference side and the trailing edge meet being defined as X=−1.510 inches and Y=−1.035 inches; the corner where the inner circumference side and the leading edge being defined by the point X=+0.034 inches and Y=+0.509 inches; and by the corner where the inner circumference side and the trailing edge meet being defined as the point X=−0.348 inches and Y=−0.372 inches from the reference point X=0 and Y=0.

The body 3 is provided with a narrow slot 17. The narrow slot 17 starts just inside the outer circumference side 5 and runs radially inward towards the inner circumference side 7 and is connected to both the outer circumference side 5 and the inner circumference side 7 by bridges 19. The narrow slot 17 acts to separate the top surface 9 of the body 3 into two surface areas, the approach surface 21 and the trailing surface 23. The approach surface 21 is defined by the outer circumference side 5, the inner circumference side 7, the leading edge 13, and the narrow slot 17. The trailing surface 23 is defined by the outer circumference side 5, the inner circumference side 7, the trailing edge 15, and the narrow slot 17. The narrow slot 17 is located on the body 3 in a non-symmetric position so that more top surface area of the body 3 is on the approach surface 21 to the narrow slot 17 than is on the trailing surface 23 of the body 3, as shown in FIG. 1. The narrow slot 17 has substantially a rectangular shape with its length running in a direction radially from the outer circumference side 5 to the inner circumference side 7. The narrow slot 17 is sized so that it has the narrowest width possible while still allowing heads (not shown) to access the flexible media (not shown) without the heads hitting or rubbing against the speed plate. The narrow slot 17 helps to reduce air flow to the head access slot of the Bernoulli plate, stabilizes the spinning media 31 by giving it more support in the area around the heads, and also allows the bottom head to clear the load bar. See FIG. 1 and FIG. 5.

In one preferred embodiment of this invention, the narrow slot 17 has a width of about 0.150 inches, a length of about 1.189 inches, and the outer edge 25 of the narrow slot has a radius distance of about 1.799 inches from the same reference point defined above by the point X=0 and Y=0. In this preferred embodiment, the centerline of the narrow slot 17 is located at about the X-axis of the reference point X=0 and Y=0.

As shown in FIG. 2 through FIG. 5, in a second preferred embodiment of this invention, the speed plate may have an additional stabilization feature . This stabilization feature comprises a first straight bend 27 in the speed plate body 3 that is located at the leading edge 13 and runs parallel to the leading edge 13 radially from the outer circumference side 5 to the inner circumference side 7. The purpose of this first bend is to prevent scratching the media 31 as it spins over the sharp leading edge of the speed plate. This stabilization feature further comprises a second bump bend 29 that is located at the outside diameter of the body 3 at the corner of the speed plate where the outer circumference side 5 and the leading edge 13 meet. The purpose of this second bend at the outside diameter of the speed plate body 3 is to stabilize the media 31 as it spun over the speed plate. This is evident by the much improved signal at elevated speeds than previously experienced by speed plates without this feature.

In one preferred embodiment of this invention the stabilization feature is added to the speed plate using a special shim bending fixture. This shim bending fixture is used to make both the straight bend 27 along the leading edge 13 and also to make the bump bend 29 on the corner of the speed plate body where the leading edge 13 and the outer circumference side 5 meet. In one preferred embodiment of this invention, the shim bending fixture consists of a top and a bottom block with the following dimensions: 3.00 inches long by 3.00 inches wide by 0.5 inches high. The top block has a bump bending corner where a recess is machined into it. The recess is machined on one corner of each block with the following dimensions: 0.375 inches long by 0.275 inches wide by 0.020 inches high. The top block also has a straight bending side where a recess is machined into the center of one side of each of the blocks. The recess for the straight bending side has the following dimensions: 1.450 inches long by 0.118 inches wide by 0.020 inches high. The bottom block has five holes that are used to attach the top block to the bottom block using screws , two screws at the bump bending corner and one screw at each of the other corners. The sides of the bottom block are rounded so as not to crease the speed plate during the bending process.

In one preferred embodiment of this invention, the straight bend 27 is made in the following way. The shim bending fixture is held in the left hand with the screw heads facing down and with the straight bend recess on the right side. The speed plate is grasped in the right hand along the outer circumference side 5 so the inner circumference side 7 is on the left and the leading edge 13 is on the bottom of the speed plate as observed by the person holding it. The speed plate should be held with the right forefinger and thumb on the outer circumference side just below the narrow slot 17. Insert the leading edge 13 of the speed plate into the straight bend recess of the shim bending fixture until the speed plate bottoms out in the shim bending recess. Holding the shim bending fixture in a fixed position parallel to the ground, bend the speed plate downward 90 degrees (i.e., so that the speed plate is parallel to the edge of the shim bending fixture). Care should be taken not to over bend this edge of the speed plate. In a preferred embodiment of the invention, bend 27 is located 0.039 inches from the leading edge 13.

In a preferred embodiment of this invention, the bump bend 29 is made in the following manner. The shim bending fixture is held in the left hand with the screw heads facing away and the bump bending recess on the top right corner. The speed plate is grasped with the right hand along the outer circumference side 5 so that the inner circumference side 7 is on the left and the leading edge 13 is on the bottom of the speed plate as observed by the person holding it. The speed plate should be held with the right forefinger and thumb along the outer circumference side in approximately the center of the speed plate. Insert the outer circumference side 5 and leading edge 13 corner of the speed plate into the bump bending recess of the shim bending recess until the speed plate bottoms out in the recess. Bend the speed plate away, towards the side of the shim bending fixture that has the screw heads to an angle of about 135 degrees. For best results, allow the speed plate corner to slowly slide out of the bump bending recess of the shim bending fixture after the bump bend has been completed. In a preferred embodiment of the invention, bend 29 is centered on the outer circumference side 5 at a point located 0.275 inches from the leading edge 13. The bend extends radially from the outer circumference side 5 to a point located 0.375 inches from the outer circumference side. The bend tapers gradually from this point as it approaches the inner circumference side 7, see FIG. 4.

After bending the speed plate, lay the speed plate on a flat surface and measure the bend height H at the outer circumference side 5 of the speed plate. In a preferred embodiment of this invention, the bend height H should be between $1/32$ inch and $1/16$ inch, with $3/64$ inch being the optimum, see FIG. 3.

In another embodiment of the invention, the stabilization feature comprises three bends. Bend one is located 0.39 inches from the leading edge 13. Bends two and three are radially bends. The center of the bends is 0.276 inches from the leading edge. The bends are approximately 0.30 diameter to create a bump of about $3/64+/-1/64$ inches above the bottom surface 11.

Figure 5:
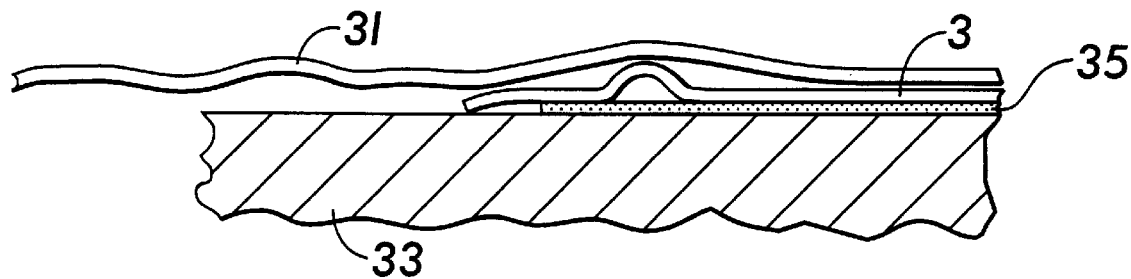
FIG. 5 shows the speed plate of FIG. 4 bonded to a Bernoulli plate and with a flexible media being spun over the speed plate.

In one preferred embodiment of this invention, the speed plate is bonded to Bernoulli plate 33, see FIG. 5, using the following method. First, the surface of the speed plate and the Bernoulli plate must be cleaned up. This clean up of the surfaces may be accomplished using any type of lint-free or low-lint wiper that has been dampened or moistened with alcohol or another suitable cleaner. Next, an adhesive is applied to the speed plate bottom surface 1. In a preferred embodiment, a two sided polyester film tape is employed for this purpose. The speed plate is then placed on a vacuum puck device with the adhesive up and is then located over the Bernoulli plate so that the Bernoulli slot zone and the narrow slot of the speed plate line up. The speed plate is then applied to and secured to the Bernoulli plate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A device for spinning a flexible media over a Bernoulli plate comprising:

a speed plate disposed on a surface on the Bernoulli plate, the speed plate having an annular section shape body with an outer circumference side, an inner circumference side, a top, a bottom, a leading edge, a trailing edge, an approach surface, and a trailing surface; and a narrow slot in the speed plate, having two sides and two ends, that starts just inside the outer circumference side and runs radially inward towards the inner circumference side, wherein the speed plate acts to change the Bernoulli surface thereby preventing the media from being sucked down to the Bernoulli plate at higher speeds.

2. The device of claim 1, further comprising a stabilization feature formed as part of or attached to the body.

3. The device of claim 2 wherein the stabilization feature further comprises:

a first straight bend located near the leading edge and running from the outer circumference side radially inward to the inner circumference side; and a second bump bend located near the leading edge and the outer circumference side.

4. The device of claim 3 wherein the stabilization feature has a bend height at the outer circumference side between about $1/32$ inches and about $1/16$ inches.

5. The device of claim 2 wherein the stabilization feature further comprises:

a first straight bend located about 0.39 inches from the leading edge and running from the outer circumference side radially inward to the inner circumference side; and a second and a third radial bends located with the center of the bends about 0.276 inches from the corner of the leading edge and the outer circumference side and having a diameter of about 0.30 inches to create a bump of about $3/64$ inches above the bottom of the speed plate.

6. The device of claim 1 wherein the width of the narrow slot is as narrow as possible but still of sufficient width so that the heads of a read/write device can access the flexible media without hitting or rubbing the speed plate.

7. The device of claim 1 wherein the narrow slot is located in a non-symmetric manner such that there is more speed plate surface on the approach surface than on the trailing surface.

8. The device of claim 1 wherein the ends of the narrow slot are attached to the outer circumference side and the inner circumference side by bridges.

9. The device of claim 1 wherein the length of the speed plate is as long as possible without creating a standing wave in the spinning flexible media while at the same time having sufficient length to avoid losing the effect of a Bernoulli surface formed between the Bernoulli plate and the spinning flexible media.

10. The device of claim 1 wherein the bottom of the speed plate is bonded to the Bernoulli plate.

11. The device of claim 10 wherein the speed plate is bonded to the Bernoulli plate using a two sided polyester film tape.

12. A device disposed on a Bernoulli plate for changing a Bernoulli surface between the Bernoulli plate and a spinning flexible media, the device comprising:

a speed plate having a metallic annular section shape body with an outer circumference side, an inner circumference side, a top surface, a bottom surface, a leading edge, a trailing edge, an approach surface, and a trailing surface;

a substantially rectangular shaped narrow slot formed in the speed plate, having two sides and two ends, that starts just inside the outer circumference side and runs radially inward towards the inner circumference side, the narrow slot being located on the annular section shape body in a non-symmetric position between the approach surface and the trailing surface such that more top surface of the speed plate body is defined by the approach surface than the trailing surface; and a stabilization feature formed on the approach surface.

13. The device of claim 12 wherein the stabilization feature further comprises:

a first straight bend located near the leading edge and running substantially parallel to the leading edge from the outer circumference side radially inward to the inner circumference side; and a second bump bend located near the leading edge and the outer circumference side, the bump bend forming an inclined surface that tapers down from the outer circumference side toward the inner circumference side.

14. A method of spinning a flexible media over a Bernoulli plate comprising the steps of:

providing a Bernoulli plate surface;

bonding a speed plate having an annular section shape body with an outer circumference side, an inner circumference side, and a leading edge to the Bernoulli plate;

spinning a flexible media in close proximity over the Bernoulli plate and speed plate in order to read from or write to the flexible media;

wherein the speed plate has a narrow slot to allow read/write heads to access the flexible media; and wherein the speed plate acts to change the Bernoulli surface thereby preventing the media from being sucked down to the Bernoulli plate at higher speeds.

15. The method of claim 14 further comprising the step of providing a flexible media stabilization feature.

16. The method of claim 15 wherein the flexible stabilization feature further comprises:

a first straight bend located near the leading edge and running from the outer circumference side radially inward to the inner circumference side; and a second bump bend located near the leading edge and the outer circumference side.

17. A method of changing a Bernoulli surface between a Bernoulli plate and a spinning flexible media, the method comprising the steps of:

providing a Bernoulli plate having a top surface;

bonding a speed plate having a metallic annular section shape body with an outer circumference side, an inner circumference side, and a leading edge to the top surface of the Bernoulli plate;

spinning a flexible media in close proximity over the Bernoulli plate and speed plate in order to read from or write to the flexible media, the spinning media creating a Bernoulli surface between the Bernoulli plate and the spinning media;

forming a narrow slot in the speed plate to allow read/write heads to access the flexible media;

changing the Bernoulli surface with the speed plate which acts to reduce the Bernoulli surface thereby preventing the flexible media from being sucked down to the Bernoulli plate at higher speeds; and stabilizing the spinning flexible media using a flexible media stabilization feature disposed on the speed plate.

18. The method of claim 17 wherein the step of stabilizing the spinning flexible media using a flexible stabilization feature further comprises the steps of:

forming a first straight bend located near the leading edge and running substantially parallel to the leading edge from the outer circumference side radially inward to the inner circumference side; and forming a second bump bend located near the leading edge and the outer circumference side, the second bump bend forming an inclined surface that tapers down from the outer circumference side toward the inner circumference side.

* * * * *

UNITED STATES PATENT AND TRADEMARK OFFICE
CERTIFICATE OF CORRECTION

PATENT NO. : 6,014,287
DATED : January 11, 2000
INVENTOR(S) : Kirt Ehlers, Hoahane Douangdara, Sheen-Haw Jenn, Michael Scoresby and Dennis Evans It is certified that error appears in the above-identified patent and that said Letters Patent is hereby corrected as shown below:

Col. 5, line 52, change "1" to -11-

Signed and Sealed this

Twenty-fourth Day of October, 2000

Attest:

Q. TODD DICKINSON

Attesting Officer       Director of Patents and Trademarks